United States Patent [19]

Tomimitsu

[11] Patent Number: 4,618,942
[45] Date of Patent: Oct. 21, 1986

[54] ADDRESS INDICATION CIRCUIT CAPABLE OF RELATIVELY SHIFTING CHANNEL ADDRESSES RELATIVE TO MEMORY ADDRESSES

[75] Inventor: Yasuharu Tomimitsu, Tokyo, Japan

[73] Assignee: NEC Corporation, Tokyo, Japan

[21] Appl. No.: 604,273

[22] Filed: Apr. 26, 1984

[30] Foreign Application Priority Data

Apr. 26, 1983 [JP] Japan .............................. 58-73267

[51] Int. Cl.⁴ ............................................ G06F 12/00
[52] U.S. Cl. ................................................ 364/900
[58] Field of Search ... 364/200 MS File, 900 MS File

[56] References Cited

U.S. PATENT DOCUMENTS

4,459,661 7/1984 Kaneda et al. ...................... 364/200

Primary Examiner—Raulfe B. Zache
Attorney, Agent, or Firm—Sughrue, Mion, Zinn, Macpeak, and Seas

[57] ABSTRACT

In an address indication circuit for use in indicating memory addresses of a random access memory to provide delays necessary for successive channels, channel addresses are determined relative to the memory addresses by assigning a reference number to a leading one of the channels and by successively accumulating the reference number and numbers determined for the delays to decide results of accumulation as the remaining channel addresses. The respective channel addresses are stored in a read-only memory (80) and added by an adder (83) to a base address variable at every time interval to provide memory addresses. When the memory addresses are equal in number to a preselected number, the base address may be produced by a counter (81) carrying out operation between zero and the preselected number less one. The adder adds the reference number to the base address modulo the preselected number.

5 Claims, 10 Drawing Figures

FIG. 10

ADDRESS INDICATION CIRCUIT CAPABLE OF RELATIVELY SHIFTING CHANNEL ADDRESSES RELATIVE TO MEMORY ADDRESSES

BACKGROUND OF THE INVENTION

This invention relates to an address indication circuit for use in accessing a random access memory of a data processing system which carries out conversion between an original data arrangement and a modified data arrangement each of which has a plurality of data words arranged in channels.

As such conversion of the type described, interleaving processing is known wherein an original data arrangement is converted into a modified data arrangement which may be called an interleaved data arrangement. As will later be described with reference to a few figures of the accompanying drawing, the interleaved data arrangement is produced by giving the original data arrangement delays predetermined for each channel of the original data arrangement.

As will also later be described with reference to the other figures of the accompanying drawing, a data processing system disclosed in Japanese Unexamined Patent Publication No. Syo 55-70918, namely, 70918/1980 carries out conversion between the original and the interleaved data arrangements by the use of a random access memory (RAM). In order to provide the delays necessary for the conversion in the data processing system, the random access memory should be accessed by a specific address indication circuit. With this system, the random access memory may have a comparatively small capacity. However, the specific address indication circuit becomes intricate more and more in structure with an increase of the channels. In addition, the specific address indication circuit can not flexibly cope with a change of the delays for the respective channels.

SUMMARY OF THE INVENTION

It is an object of this invention to provide an address indication circuit which is operable in cooperation with a comparatively small capacity of random access memory and which is simple in structure even when the number of channels increases.

It is another object of this invention to provide an address indication circuit of the type described, which is capable of flexibly coping with a change of delays.

An address indication circuit to which this invention is applicable is for use in combination with a random access memory included in a data processing system to indicate memory addresses of the random access memory for data sets arranged in a leading channel and other successive channels following the leading channel. The address indication circuit is for indicating each of the memory address with different delays predetermined for the channels, respectively. The different delays are equal to integral multiples of a prescribed time interval. The system comprises signal generating means for generating channel signals specifying the respective channels. According to this invention, the address indication circuit comprises channel address producing means responsive to the channel signals for producing, as a set of channel addresses, a reference number for the leading channel and integers for the respective successive channels. Each of the integers are determined in relation to the reference number by successively accumulating the reference number and each of the integral multiples. The address indication circuit comprises pointer means for pointing one of the addresses as a base address that is variable at every prescribed time interval and calculating means for calculating sums of the base address plus the channel addresses to provide the memory addresses.

Figure 1:
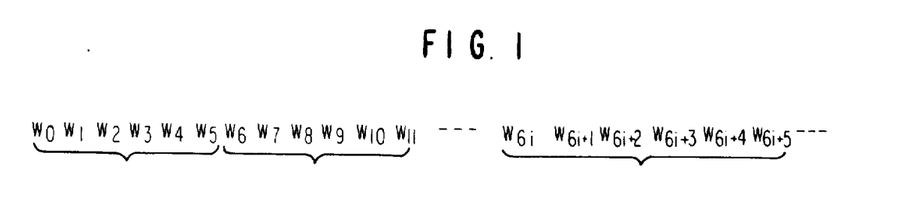
FIG. 1 shows a chart for describing a primitive arrangement of data words.
Figure 2:
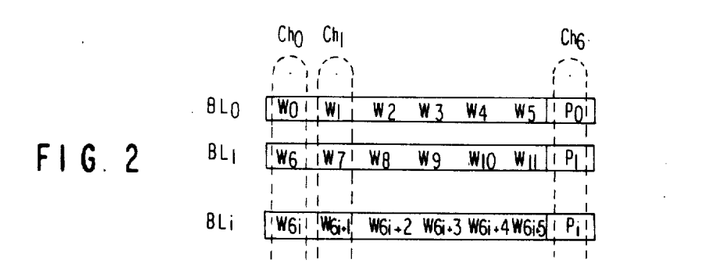
FIG. 2 shows a chart for describing a first arrangement produced from the primitive arrangement.
Figure 3:
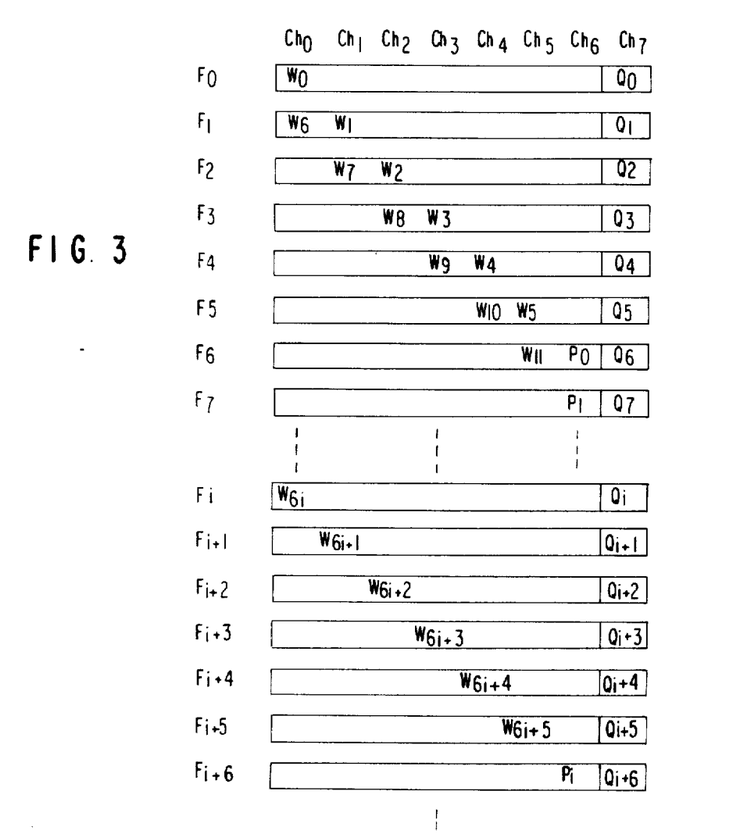
FIG. 3 shows a chart for describing a second arrangement produced by rearranging the first arrangement.

DESCRIPTION OF THE PREFERRED EMBODIMENTS:

Referring to FIGS. 1 through 3, an interleaved code sequence will be described at first for a better understanding of this invention. In FIG. 1, a succession of primitive data words $w_0, w_1, \ldots, w_{6i+5}$ each of which may be called a data set is produced as a pulse code modulation (PCM) signal from an analog-to-digital converter (not shown) and is divisible into a succession of primary set. Each of the primary sets consists of a predetermined number of data words. In the illustrated example, the predetermined number is equal to six. Therefore, the illustrated data words are divided into the primary sets $(w_0, w_1, \ldots, w_5), (w_6, w_7, \ldots, w_{11}), \ldots, (w_{6i}, w_{6i+1}, \ldots, w_{6i+5})$.

In FIG. 2, the primary sets are arranged into a succession of blocks $BL_0, BL_1, \ldots, BL_i$ together with primary check words $P_0, P_1, \ldots, P_i$, respectively. The blocks $BL_0, BL_1, \ldots, BL_i$ may be named a zeroth block, a first block, ..., an i-th block and the primary check words $P_0, P_1, \ldots, P_i$ may be named zeroth, first, ..., i-th primary check words, respectively. Arrangement of the data words and the primary check words may be called a first arrangement. Each of the illustrated blocks $BL_0, BL_1, \ldots, BL_i$ has zeroth through fifth data words and a single primary check word arranged from left to right of FIG. 2. In the example being illustrated, the zeroth through the fifth data words of the respective blocks $BL_0, BL_1, \ldots, BL_i$ are placed in zeroth through fifth channels $Ch_0, Ch_1, \ldots, Ch_5$, respectively, while the primary check words, in a sixth channel $Ch_6$.

Although a single primary check word alone is assigned to each block for simplicity of description, a plurality of primary check words may be included in each block in relation to the predetermined number of primitive data words arranged in each block.

In FIG. 3, each of the blocks illustrated in FIG. 2 is rearranged into a succession of secondary sets by giving a plurality of delays to the data words and the primary check word of each block, respectively. More particularly, the zeroth data words $w_0, w_6, \ldots, w_{6i}$ in the zeroth channel $Ch_0$ are not delayed while the first data words $w_1, w_7, \ldots, w_{6i+1}$ in the first channel $Ch_1$ are given a unit delay, as readily understood from FIGS. 2 and 3. Likewise, the second through the fifth data words and the primary check codes in the second through the sixth channels $Ch_2$ to $Ch_6$ are provided with delays equal to two through six times the unit delay, respectively. Thus, zeroth through $(i+6)$-th ones of the secondary sets are formed as shown in FIG. 3.

Thereafter, zeroth through $(i+6)$-th secondary check words $Q_0$ to $Q_{i+6}$ are added to the zeroth through the $(i+6)$-th secondary sets to form zeroth through $(i+6)$-th frames $F_0$ to $F_{i+6}$, respectively, as shown in FIG. 3. Arrangement of the frame may be referred to as a second arrangement. A plurality of secondary check words may be assigned to each frame in consideration of the number of the channels arranged in each frame. The illustrated unit delay is equal to a frame period of each frame but may be equal to two or three times or the like of the frame period.

Although only the data words $w_0$ to $w_6$, $w_7$ to $w_{11}$, and $w_{6i}$ to $w_{6i+5}$ are depicted together with the primary check words $P_0, P_1, \ldots, P_i$ in the frames illustrated in FIG. 3, the remaining portions of each frame are filled as each secondary set with data words and primary check words included in the preceding and the succeeding blocks. As a result, a combination of each secondary set with a secondary check word is produced as the interleaved code sequence. Such a combination may be referred to as an interleaved code arranged in each frame. Thus, the interleaved code sequence is a resultant sequence of the interleaved codes. The interleaved codes are modulated and recorded on a recording medium, such as a compact disc, a magnetic tape, or the like with a synchronization signal preceding each interleaved code, as known in the art. A single random error can be corrected when the interleaved code sequence is reproduced with the second arrangement kept. Let a burst error occurs in the third frame $F_3$ illustrated in FIG. 3. In other words, all of the data words, such as $w_8, w_3$, are assumed to be erroneous in the third frame $F_3$ due to the burst error. Such burst error can not be corrected insofar as the second arrangement is kept to reproduce the interleaved code sequence. Herein, let the second arrangement be rearranged into the first arrangement illustrated in FIG. 2 to reproduction of the interleaved code sequence. In this event, the respective data words, such as $w_8, w_3$, are assigned to the blocks different from one another in the first arrangement, as depicted at 15 in FIG. 2. This means that the burst error in the second arrangement appears as a single error in each block BL of the first arrangement. Inasmuch as such a single error can be corrected in each block, it is possible to correct the burst error occurring in the second arrangement when the second arrangement is rearranged into the first arrangement.

Figure 4:
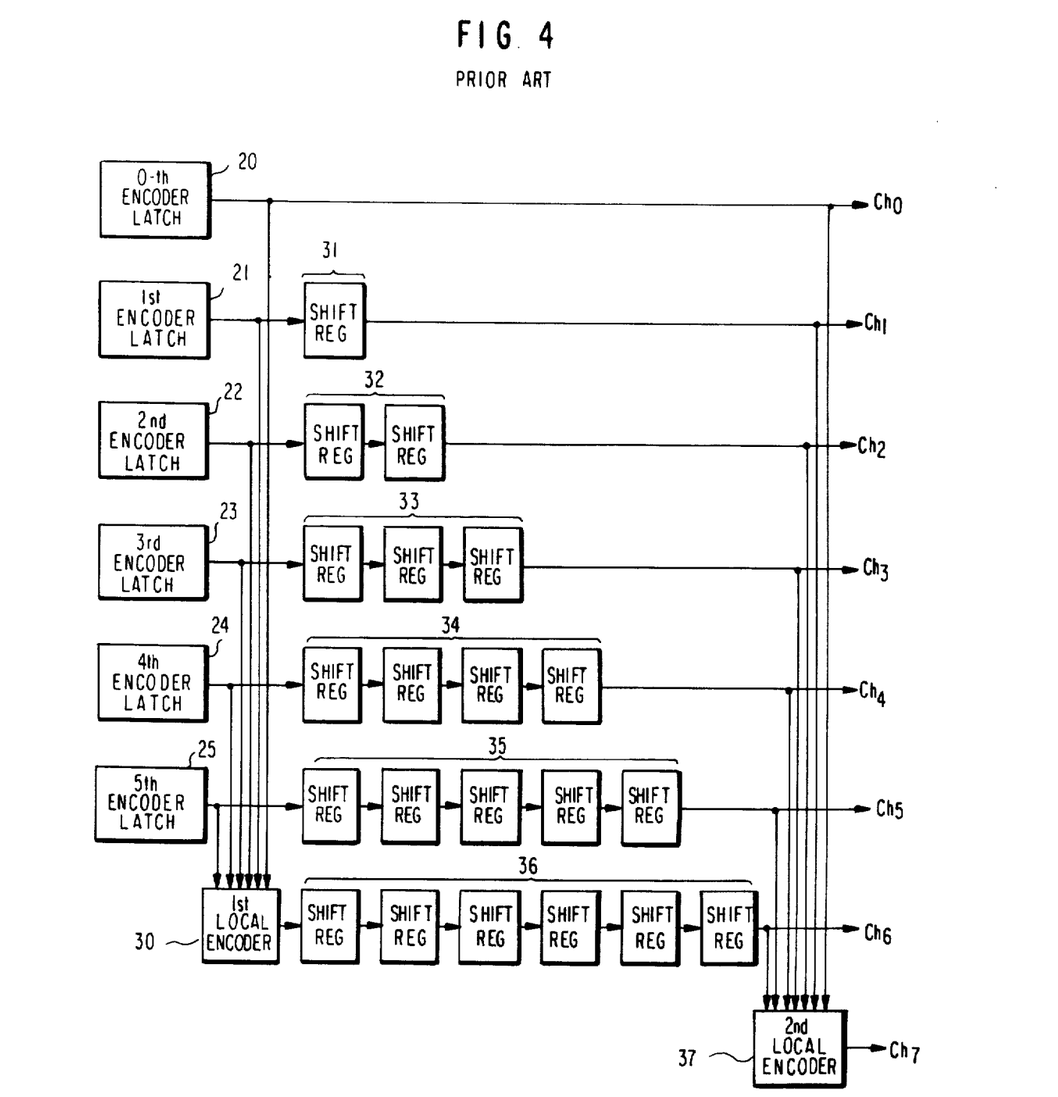
FIG. 4 shows a block diagram of a conventional encoder for encoding the first arrangement into the second arrangement.

Referring to FIG. 4 together with FIGS. 2 and 3, a description will be made as regards a conventional circuit which is for use in encoding a first arrangement (as shown in FIG. 2) into a second one (as shown in FIG. 3) and which may therefore be referred to as an encoder. The illustrated encoder comprises zeroth through fifth encoder latches 20 to 25 successively supplied from an analog-to-digital converter (not shown) with the zeroth through the fifth data words (represented by $w_0$ to $w_5$), respectively.

A first local encoder 30 is coupled to the zeroth through the fifth encoder latches 20 to 25 to produce each primary check code $P_0$ and, thereby, to form the zeroth block $BL_0$ as shown in FIG. 2. The zeroth data word $w_0$ is allowed to pass through the encoder without any delay and is placed as a zeroth resultant data word in the zeroth channel of the zeroth frame $F_0$ illustrated in FIG. 3. The first word $w_1$ is sent from the first encoder latch 21 to a first group 31 of shift registers which serves to provide the unit delay equal to the frame period. The first group 31 of shift registers produces a first resultant word $w_i$ arranged in the first channel of the first frame $F_1$, as illustrated in FIG. 3.

Similarly, the second through the fifth words $w_2$ to $w_5$ are supplied from the second through the fifth encoder latches 22 to 25 to those second through fifth groups 32 to 35 of shift registers which provide two through five times the unit delay D, respectively. The second through the fifth groups 32 to 35 of shift registers produce second through fifth resultant words $w_2$ to $w_5$ allotted to the second through fifth channels $Ch_2$ to $Ch_5$ of the second through the fifth frames $F_2$ to $F_5$, respectively. Likewise, the zeroth primary check word $P_0$ is given a delay equal to six times the unit delay D through a sixth group 36 of shift registers and is allotted to the sixth channel $Ch_6$ of the sixth frame $F_6$ as a zeroth resultant check word $P_0$, as illustrated in FIG. 3.

Responsive to the resultant data and check words, a second local encoder 37 produces each secondary check code Q in an additional channel or a seventh channel $Ch_7$ following the sixth channel $Ch_6$.

It is noted here that each secondary check word $Q_0$ through $Q_{i+6}$ is produced at every frame after production of each resultant primary check word. As a result, the sixth one ($Q_6$) of the secondary check words is preceded by the zeroth resultant primary check word $P_0$ for the zeroth block $BL_0$ illustrated in FIG. 2.

Each secondary check word may be produced immediately after appearance of each resultant primary check word. Therefore, each resultant primary check word is not delayed by a group of shift registers.

Similar operation is successively carried out in connection with the remaining blocks, such as $BL_1, BL_i, \ldots$ At any rate, each of the primary check codes $P_0, P_1, \ldots, P_i$ appears as each resultant primary check word after six frames and is immediately followed by each secondary check code.

The first through the fifth resultant data words are formed together with each resultant primary check code and each corresponding secondary check code into the second arrangement in a well-known manner.

Figure 5:
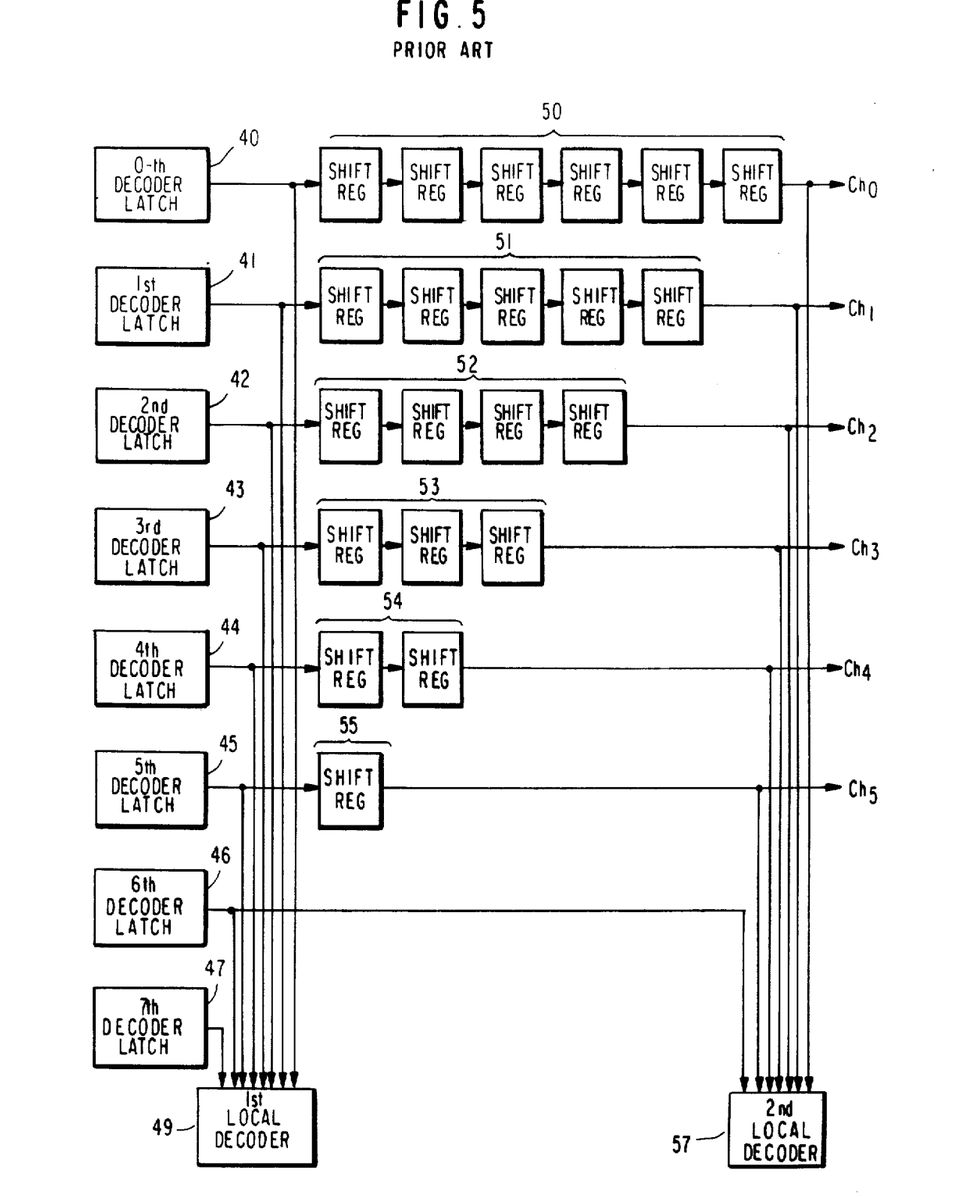
FIG. 5 shows a block diagram of a conventional decoder for decoding the second arrangement into the first arrangement.

Referring to FIG. 5 together with FIGS. 2 and 3, a conventional decoder is for use in combination with the conventional encoder illustrated in FIG. 4 so as to decode the second arrangement into the first arrangement. Supplied with each frame of the second arrangement, the decoder comprises zeroth through seventh decoder latches 40 to 47 for the zeroth through the seventh channels $Ch_1$ to $Ch_7$ of each frame, respectively. As a result, the first through the fifth decoder latches 40 to 45 are loaded with the zeroth through the fifth resultant data words arranged in each frame while the sixth and the seventh decoder latches 46 and 47, a resultant primary check word and a secondary check code of each frame, as shown in FIG. 3.

A first local decoder 49 is coupled to the zeroth through the seventh decoder latches 40 to 47 to check presence or absence of an error or errors with reference to each secondary check code Q (suffix omitted) and to correct such an error if error correction is possible, as known in the art. The zeroth through the fifth resultant data words of each frame are supplied to zeroth through fifth sets of shift registers 50, respectively. The zeroth through the fourth sets 50 to 54 of shift registers give the zeroth through the fourth resultant data words delays equal to six through two times the unit delay, respectively, while the fifth set 55 of shift registers gives the fifth resultant data word a delay equal to the unit delay. As a result, zeroth through fifth delayed data words are sent from the zeroth through the fifth sets 50 to 55 of shift registers through zeroth through fifth channels $Ch_0$ to $Ch_5$, respectively. The zeroth through the fifth delayed data words form the first arrangement together with the resultant primary check word kept in the sixth set 46 of shift registers, as will presently be described. The resultant primary check word is directly supplied to a second local decoder 57 supplied with the zeroth through the fifth delayed data words also. The second local decoder 57 checks presence or absence of an error or errors to correct such an error, if possible, in a well-known manner.

In FIG. 3, let the zeroth resultant data word $w_0$ of the zeroth frame $F_0$ be given to the zeroth set 50 of shift registers. The resultant zeroth data word $w_0$ appears as the zeroth delayed data word after six frames. The first resultant data word $w_1$ in the first frame $F_1$ is given to the first set 51 of shift registers to be produced as the first delayed data word five frames after. Accordingly, the first resultant data word $w_1$ appears in the sixth frame. Likewise, the second through the fifth resultant data words $w_2$ to $w_5$ in the second through the fifth frames $F_2$ to $F_5$ appear as the second through the fifth delayed data words in the sixth frame $F_6$, respectively, together with the zeroth resultant primary check word $P_0$. As a result, the second arrangement is converted into the first arrangement.

If the zeroth through the seventh decoder latches 40 to 47 are kept in mind, the zeroth through the fifth channels $Ch_0$ to $Ch_5$ of the second arrangement are given the delays equal to seven through two times the unit delay, respectively, while each of the sixth and the seventh channels $Ch_6$ and $Ch_7$ is delayed the unit delay. Such a unit delay may be called a prescribed time interval.

With this structure, a great number of shift registers should be arranged in each of the encoder and the decoder in compliance with the number of the channels and the delays necessary for conversion between the first and the second arrangement. Therefore, the illustrated encoder and decoder are not economical.

Figure 6:
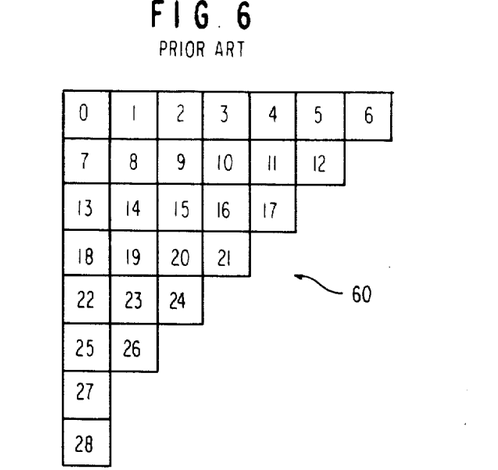
FIG. 6 shows a memory address map for use in describing a random access memory of another conventional encoder.

Referring to FIG. 6, another conventional method will be described to facilitate an understanding of this invention and is substantially equivalent to that described in Japanese Unexamined Patent Publication No. Syo 55-70918, namely, 70918/1980 referenced in the preamble of the instant specification. For brevity of description, decoding or reproducing alone will be described hereinafter. Encoding is also possible in a similar manner.

With this method, a random access memory (RAM) 60 is used to provide the delays necessary for the conversion between the first and the second arrangements. As to the decoding, the zeroth through the fifth resultant data words of each frame which are written within a time interval very shorter than the unit delay may be read out of the random access memory 60 from seven frames down to two frames after, respectively, so as to decode the second arrangement into the first one, as described in conjunction with FIG. 5. The resultant primary check word P and the secondary check word Q may be read after the unit delay.

Under the circumstances, the random access memory 60 has twenty-nine addresses consecutively numbered from a zeroth address to a twenty-eighth address, as illustrated in FIG. 6. The addresses are divided into zeroth through sixth columns corresponding to the delays, as will presently become clear, and zeroth through seventh rows corresponding to the zeroth through the seventh channels of each frame which are described with reference to FIG. 3.

It is assumed that an access mode for each of the zeroth through the seventh rows of the random access memory 60 is divided into a write-in mode and a read-out mode following the write-in mode. When a certain address is accessed in one of the rows during the write-in mode, another address can be accessed in the one row during the read-out mode following the write-in mode.

Let one of the zeroth through the sixth columns be successively and cyclically indicated at every frame on the zeroth row. In addition, let the zeroth frame $F_0$ (FIG. 3) be written in the write-in modes into the leftmost addresses 0, 7, 13, 18, 22, 25, 27, and 28 of the zeroth column which are assigned to the zeroth through the seventh channels of the zeroth frame, respectively, as mentioned before. As a result, the zeroth resultant data word $w_0$ and a zeroth one of the secondary check words $Q_0$ illustrated in FIG. 3 are written into the zeroth and the twenty-eighth addresses 0 and 28, respectively.

In this event, the zeroth address on the zeroth row is recurrently accessed seven frames after. Thus, the delay of seven frames can be accomplished, as in the case with the zeroth set 50 of shift registers illustrated in FIG. 5.

Likewise, each address of the first through the fifth rows is cylically accessed six through two frames after, respectively, while each address of the sixth and the seventh rows is accessed a single frame after. Therefore, operation can be carried out in a manner similar to that illustrated in FIG. 3. In order to carry out the above-mentioned operation, the zeroth through the seventh rows of the random access memory 60 should be accessed at different recurrent cycles.

Figure 7:
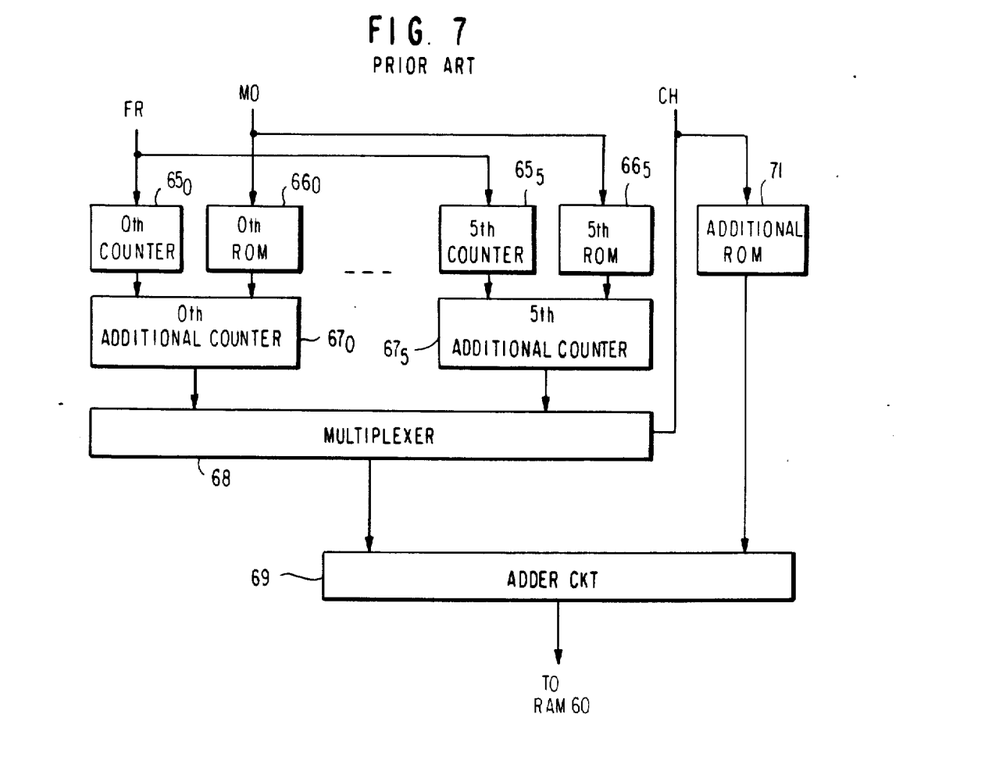
FIG. 7 shows a block diagram of a conventional address indication circuit for use in accessing the random access memory illustrated in FIG. 6.

Referring to FIG. 7, an address indication circuit is for use in combination with the random access memory 60 so as to indicate each address in the above-mentioned manner. The illustrated indication circuit is operable in cooperation with a control circuit (not shown) which produces a frame pulse FR synchronized with each frame, channel signals CH specifying the zeroth through the seventh channels of each frame, and a mode indication pulse MD representative of either the write-in mode or the read-out mode. The mode indication pulse MD is changed from a logic "1" level to a logic "0" level during each channel signal CH to indicate the write-in and the read-out modes, respectively.

The illustrated indication circuit comprises zeroth through seventh counters $65_0$ to $65_5$ for counting each of the frame pulses FR. The zeroth counter $65_0$ is assigned to the zeroth row of the random access memory 60 for the zeroth channel and may be repeated between 0 and 6, as readily understood from FIG. 6. Therefore, the zeroth counter $65_0$ may be a septenary up-counter. The first counter $65_1$ (not shown) may be repeated between 7 and 12 and therefore be a sexenary up-counter. Likewise, the second through the fifth counters $65_2$ (not shown) to $65_5$ may be between 13 and 17, between 18 and 21, between 22 and 24, and between 25 and 26 and may be quinary, quarternary, ternary, and binary upcounters, respectively.

During the read-out mode following the write-in mode, an additional address on each row is accessed as mentioned before. For this purpose, zeroth through fifth read-only memories $66_0$ to $66_5$ are loaded with relative addresses for indicating positions to be read out on each row. The relative addresses are read out of the zeroth through the fifth read-only memories $66_0$ to $66_5$ in the read-out mode to be sent to zeroth through fifth additional counters $67_0$ to $67_5$ which may be similar to the zeroth through the fifth counters $65_0$ to $65_5$, respectively. The outputs of the zeroth through the fifth additional counters $67_0$ to $67_5$ are selected by a multiplexer 68 in response to the channel signals CH to be delivered to an adder circuit 69.

The adder circuit 69 is supplied with leading addresses, namely, 0, 7, 13, 18, 22, 25, 27, and 28 of the respective rows from an additional read-only memory 71. Inasmuch as each leading address is read out of the additional read-only memory 71 in response to the channel signal CH, the adder circuit 69 supplies the random access memory 60 with either each write-in address or each read-out address as a memory address. The leading addresses 27 and 28 are produced through the adder circuit 69 in connection with the sixth and the seventh channels $Ch_6$ and $Ch_7$ as they stand.

Inasmuch as the random access memory 60 may have a memory area irreducibly necessary for memorizing the delays without any superfluous memory area, it is possible to reduce a word capacity of the random access memory 60. However, the method is disadvantageous in that the address indication circuit becomes intricate in structure. More specifically, the address indication circuit should have those combinations of the counters 65, the read-only memories 66, and the additional counters 67 which are equal in number to the channels $Ch_0$ to $Ch_5$. The number of the combinations should increase with an increase of the channels.

Figure 8:
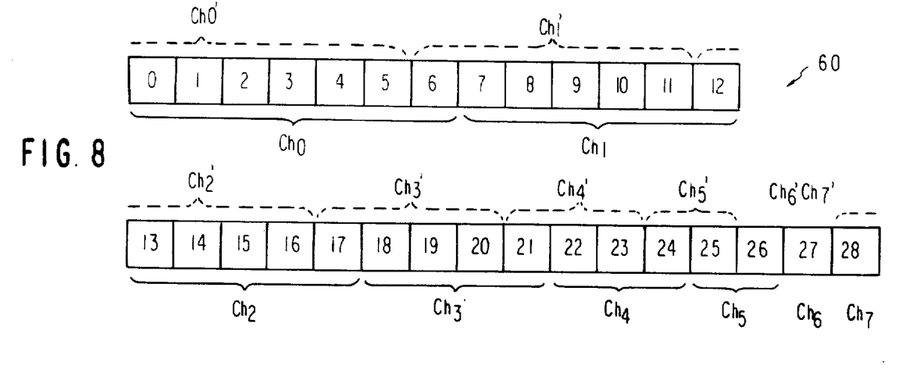
FIG. 8 shows a memory address map for use in describing a principle of this invention.

Referring to FIG. 8, a principle of this invention will be described as regards decoding of the second arrangement into the first arrangment by the use of a random access memory 60 which is similar to that illustrated with reference to FIG. 6. As shown in FIG. 8, the random access memory 60 has twenty-nine memory addresses, namely, absolute addresses consecutively numbered from a zeroth address to a twenty-eighth address.

As mentioned in conjunction with FIGS. 3, 5, and 6, the zeroth through the fifth channels $Ch_0$ to $Ch_5$ need to provide the delays from seven frames down to two frames, respectively, and each of the sixth and the seventh channels $Ch_6$ and $Ch_7$ is delayed a single frame. Let channel addresses be assigned to the respective channels $Ch_0$ to $Ch_7$ and be initially coincident with the memory addresses. In this state, beginning channel addresses of the respective channels are situated at the memory addresses 0, 7, 13, 18, 22, 25, 27, and 28 while the end channel addresses of the zeroth through the fifth channels $Ch_0$ to $Ch_5$ are placed at the memory addresses 6, 12, 17, 21, 24, and 26 with the end channel addresses of the sixth and the seventh channels common to the beginning channel addresses thereof. It is assumed that the memory addresses 0, 7, 13, 18, 22, 25, 27, and 28 are indicated in a current frame and that the respective channel addresses are successively moved relative to the memory addresses forwardly or leftwardly one by one at every frame period with the delays kept thereamong, as exemplified by $Ch_0'$ to $Ch_7'$. It will readily be understood that the memory address 0 is again indicated seven frame periods after while the memory address 7 is indicated six frame periods after. Likewise, the memory addresses 13, 18, 22, and 25 are indicated five through two frame periods after, respectively. The memory addresses 27 and 28 are indicated after the single frame period. This means that the zeroth through the seventh channels $Ch_0$ to $Ch_7$ are given the delays necessary for the conversion, like in FIGS. 6 and 7. Thus, the channel addresses are not fixedly determined with respect to the memory addresses but shifted or varied relative to the memory addresses at every frame period.

Figure 9:
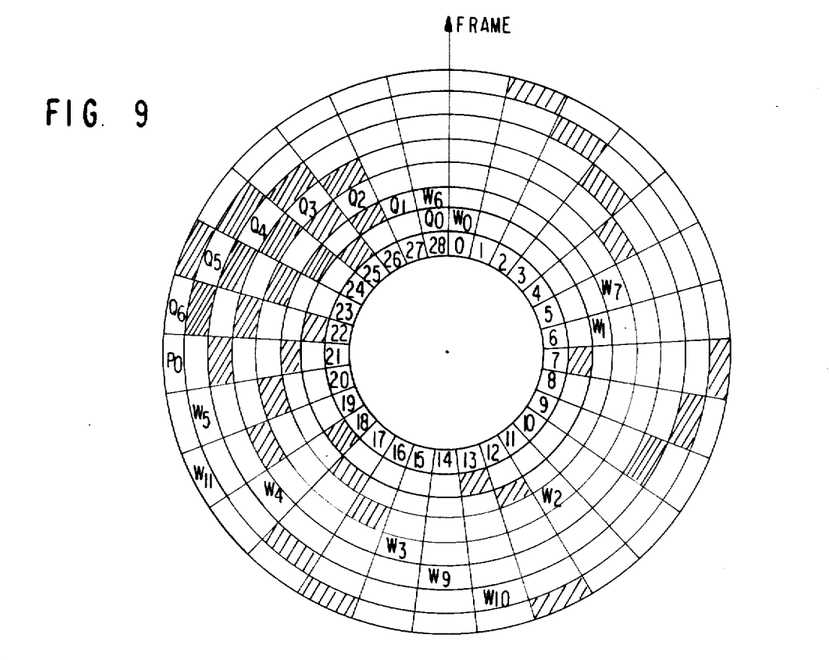
FIG. 9 shows a memory map for use in describing operation of this invention.

Referring to FIG. 9 together with FIGS. 3 and 8, the decoding operation will be described more in detail. Concentric circles are depicted together with outer parts of a plurality of radii. Innermost numbers from 0 to 28 represent the absolute memory addresses, respectively. Let the circles be successively shifted from an inner one to an outer one at every frame. Initially, let the zeroth through the sixth ones of the memory addresses be assigned in the zeroth frame $F_0$ (FIG. 3) to the zeroth channel $Ch_0$. Similarly, the remaining memory addresses are assumed to be the first through the seventh channels $Ch_1$ to $Ch_7$, respectively, like in FIG. 8. In this event, the zeroth data word $w_0$ and the zeroth secondary check word $Q_0$ are written in the write-in mode in the zeroth and the twenty-eighth memory addresses 0 and 28, respectively. The remaining data and resultant primary check words in the zeroth frame $F_0$ are written in the seventh, the thirteenth, the eighteenth, the twenty-second, the twenty-fifth, and the twenty-seventh memory addresses 7, 13, 18, 22, 25, and 27, as indicated by hatches. Thus, the zeroth frame of the second arrangement is written into the memory addresses 0, 7, 13, 18, 22, 25, 27, and 28 and can be subjected to error check operation in a known manner. Thereafter, the first arrangement is read out of the read-only memory in the read-out mode to check an error with reference to the primary check word P, as will become clear later.

The zeroth through the seventh channels $Ch_0$ to $Ch_7$ are shifted by one in relation to the zeroth through the twenty-eighth memory addresses 0 to 28. In the example being illustrated, each channel is forwardly shifted by one, as illustrated in FIG. 8. As a result, the first frame (FIG. 3) are written in the twenty-eighth, the sixth, the twelfth, the seventeenth, the twenty-first, the twenty-fourth, the twenty-sixth, and the twenty-seventh memory addresses 28, 6, 12, 17, 21, 24, 26, and 27. In this case, the first resultant data word $w_1$ and the first secondary check word $Q_1$ are memorized in the sixth and the twenty-seventh memory addresses 6 and 27, respectively. Under the circumstances, it is possible to carry out error check operation, as mentioned before in conjunction with the zeroth frame $F_0$.

Let similar operation be successively carried out until the sixth frame $F_6$ (FIG. 3). Under the circumstances, the zeroth through the fifth data words $w_0$ to $w_5$ and the zeroth primary check word $P_0$(FIG. 2) are stored in the zeroth, the sixth, the eleventh, the fifteenth, the eighteenth, the twentieth, and the twenty-first memory addresses 0, 6, 11, 15, 18, 20, and 21, respectively. Consideration is directed to the sixth frame $F_6$ specified by outermost sectors of FIG. 9. In the sixth frame $F_6$, the beginning channel addresses of the zeroth through the fifth channels point the memory addresses 23, 1, 7, 12, 16, and 19, respectively, while the sixth and the seventh channels $Ch_6$ and $Ch_7$ are stored in 21 and 22, respectively. It should be noted here that, in the sixth frame, the end channel addresses of the zeroth through the fifth channels $Ch_0$ to $Ch_5$ point the memory addresses 0, 6, 11, 15, 18, and 20 in which the zeroth through the fifth data words $w_0$ to $w_5$ are stored, respectively, as mentioned before.

This means that each end channel address of the zeroth through the fifth channels may be accessed together with the sixth and the seventh channels in each read-out mode to derive the first arrangement from the random access memory after each leading channel address of the zeroth through the seventh channels is accessed to store and check the second arrangement.

Figure 10:
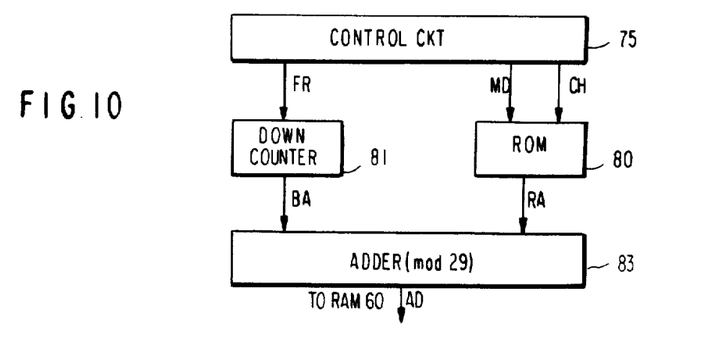
FIG. 10 shows a block diagram of an address indication circuit according to a preferred embodiment of this invention.

Referring to FIG. 10 together with FIG. 9, an address indication circuit according to a preferred embodiment of this invention is for use in combination with a control circuit 75 for producing frame pulses FR, channel signals CH, and mode pulses MD which are similar to those illustrated with reference to FIG. 7.

In the example being illustrated, a combination of the channel signal CH and the mode indication pulse MD is supplied as a local address signal to a read-only memory 80 having first and second memory areas selected by the mode indication signal MD. The first area is loaded with the beginning channel addresses of the zeroth through the seventh channels $Ch_0$ to $Ch_7$, respectively. In this event, a preselected reference number of, for example, 0 is assigned to the beginning channel address of the zeroth channel $Ch_0$. The beginning channel addresses of the first through the seventh channels $Ch_1$ to $Ch_7$ are specified by the delays equal to integral multiples of the unit delay or the frame period, as readily understood from FIG. 5. More particularly, the zeroth chanel $Ch_0$ should be given the delay equal to seven times the unit delay. The beginning channel address of the first channel $Ch_1$ is determined by adding seven to the preselected reference number. The resultant beginning channel address of the first channel becomes equal to 7. The first channel $Ch_1$ should be delayed six frame periods. The beginning channel address of the second channel $Ch_2$ is determined by accumulating the preselected reference number, seven, and six and therefore becomes equal to 13. Similarly, the beginning channel addresses of the third through the seventh channels $Ch_3$ to $Ch_7$ becomes equal to 18, 22, 25, 27, and 28, respectively.

Anyway, the respective beginning channel addresses are representative of relative addresses RA determined in relation to the leading address of the zeroth channel $Ch_0$ and are varied in relation to the memory addresses of the random access memory. The relative addresses RA take integers determined in relation to the delays for the respective channels and are stored in the first area of the read-only memory 80.

The second area is loaded with those end channel addresses of the first through the seventh channels $Ch_1$ to $Ch_7$ which are determined in a manner similar to the beginning channel addresses and specified by the numbers of 6, 12, 17, 21, 24, 26, 27, and 28, respectively. The end channel addresses of the sixth and the seventh channels $Ch_6$ and $Ch_7$ are common to the beginning addresses thereof, respectively.

With this structure, the read-only memory 80 at first produces the predetermined reference number 0 in the write-in mode and the number 6 in the read-out mode in response to the channel signals CH. Thereafter, the numbers 7 and 12 for the first channel $Ch_1$ are read out of the read-only memory 80 in the write-in and the read-out modes in response to the channel signals CH. Likewise, the numbers 13 and 17; 18 and 21; 22 and 24; and 25 and 26 are successively read out of the read-only memory 80 in the write-in and the read-out modes for the second through the seventh channels $Ch_2$ to $Ch_5$. Each of the numbers 27 and 28 is read out two times in response to each of the channel signals CH. From this fact, it is readily understood that the read-only memory 80 comprises an access circuit for selectively accessing the first and the second areas in response to the channel signals CH and the mode indication signals MD. Such an access circuit serves as a part of a circuit for selectively producing the beginning and the end channel addresses.

In FIG. 10, the illustrated address indication circuit comprises a down-counter 81 of a full count of 28 which is counted down one by one in response to each frame pulse FR to cyclically carry out count operation between 0 and 28. Each count is in one-to-one correspondence to each memory address of the random access memory 60 and is produced as a base address BA. Accordingly, the down-counter 81 may be referred to as a pointer for pointing the base address at every frame.

The base address BA and each of the relative addresses RA are sent to an adder 83 which carries out addition modulo 29 to produce a sum of the base address BA and each relative address RA. The sum is sent to the random access memory 60 as an address signal AD specifying each of the memory addresses.

Let the base address be equal to zero. In this event, each relative address RA becomes equal to each of the memory address (AD). Therefore, the memory addresses of 0, 7, 13, 18, 22, 25, 27, and 28 are accessed to memorize the second arrangement in the respective write-in modes, as readily understood from FIG. 9 while the memory addresses of 6, 12, 17, 21, 24, 26, and 27 are accessed to derive the first arrangement in the respective read-out modes from the random access memory 60.

In the next following frame or cycle, the down-counter 81 is counted down into 28 to produce the number 28 as the base address. When the relative addresses RA are added modulo 29 to the number 28, the second arrangement is allotted to the memory addresses of 28, 6, 12, 17, 21, 24, 26, and 27 in the write-in modes while the first arrangement is derived from the memory addresses of 5, 11, 16, 20, 23, 25, and 26.

Similar operation is repeated at every frame. As a result, the data words and the check words are stored in the random access memory 60 in the manner illustrated in FIG. 9.

In FIGS. 9 and 10, the base address is successively shifted counterclockwise at every frame because the down-counter 81 is used in the address indication circuit. This operation is equivalent to that carried out when a memory map illustrated in FIG. 9 is shifted in a clockwise direction at every frame with the base address unchanged. Such shift operation of the memory map may be possible by the use of a cyclic shift register of twenty nine stages.

While this invention has thus far been described in connection with the preferred embodiment of this invention thereof, it is readily understood for those skilled in the art to put this invention into practice in various other manners. For example, encoding is also possible in a manner illustrated in the above. In this event, the relative addresses for the respective channels may be determined in consideration of the delays illustrated in FIG. 4. More particularly, when the zeroth channel $Ch_0$ is given the relative address "0", the first and the second relative addresses 1 and 2 may be assigned to the first channel $Ch_1$ while the third through the fifth relative addresses 3 to 5, the second channel $Ch_2$. Likewise, the sixth through the twenty-eighth relative addresses are assigned to the third through the seventh channels $Ch_3$ to $Ch_7$. An up-counter may be used instead of the down-counter 81 to shift the base address clockwise. In FIG. 10, a programmable logic array or a decoder may be substituted for the read-only memory 80. Anyway, the illustrated address indication circuit can readily cope with a change of channels and delays by changing contents of the read-only memory 80. Finally, a single bit may be arranged in each data word.

What is claimed is:

1. An address indication circuit for use in combination with a random access memory included in a data processing system to indicate memory addresses of said random access memory for data sets arranged in a leading channel and other successive channels following said leading channel, said address indication circuit being for indicating each of said memory address with different delays predetermined for said channels, respectively, said different delays being equal to integral multiples of a prescribed time interval, said system comprising signal generating means for generating channel signals specifying the respective channels, wherein the improvement comprises:

channel address producing means responsive to said channel signals for producing, as a set of channel addresses, a reference number for said leading channel and integers for the respective successive channels, each of said integers being determined in relation to said reference number by successively accumulating said reference number and each of said integral multiples;

pointer means for pointing one of said addresses as a base address that is variable at every prescribed time interval; and calculating means for calculating sums of said base address plus said channel addresses to provide the memory addresses.

2. An address indication circuit as claimed in claim 1, each of said channels being specified by a beginning and an end channel address, wherein said channel address producing means comprises:

a first part for storing said reference number and said integers as said channel address set to specify each beginning channel address of said channels;

a second part for storing additional integers which are determined as an additional set of channel addresses in consideration of said reference number and said integral multiple to specify each of said end channel addresses for said leading and said successive channels; and means for selectively supplying said calculating means with said channel address set and said additional channel address set.

3. An address indication circuit as claimed in claim 1, said memory addresses being equal in number to a preselected number, wherein said pointer means comprises:

counting means energized at every prescribed time interval for carrying out counting operation between zero and said preselected number less one.

4. An address indication circuit as claimed in claim 3, wherein said calculating means comprises:

an adder for adding said channel addresses to said base address modulo said predetermined number to provide said sums.

5. An address indication method for indicating memory addresses of data sets arranged in a leading channel and other successive channels to provide different delays predetermined for said channel, said different delays being equal to integral multiples of a prescribed time interval, said method comprising the steps of:

assigning a reference number of said leading channel;

successively accumulating said reference number and each of said integral multiples to determine integers for the respective successive channels;

pointing one of said addresses as a base address that is variable at every prescribed time interval; and calculating sums of said base address and each of said reference number and said integers to provide the memory addresses.

* * * * *